United States Patent
Butera et al.

(10) Patent No.: US 7,232,367 B2
(45) Date of Patent: Jun. 19, 2007

(54) AIR-DISTRIBUTION SYSTEM FOR THE DASHBOARD OF A MOTOR VEHICLE AND THE DASHBOARD OF A MOTOR VEHICLE COMPRISING SAID SYSTEM

(75) Inventors: Francesco Butera, Turin (IT); Marco Biasiotto, Turin (IT); Stefano Alacqua, Rivoli Cascine Vica (IT)

(73) Assignee: C.R.F. Società Consortile per Azioni, Orbassano (Torino) (IT)

(*) Notice: Subject to any disclaimer, the term of this patent is extended or adjusted under 35 U.S.C. 154(b) by 0 days.

(21) Appl. No.: 11/010,312

(22) Filed: Dec. 14, 2004

(65) Prior Publication Data

US 2005/0130580 A1 Jun. 16, 2005

(30) Foreign Application Priority Data

Dec. 16, 2003 (IT) .................... TO2003A001008

(51) Int. Cl.
*B60H 1/26* (2006.01)
(52) U.S. Cl. .................. 454/121; 165/202; 165/204; 454/127
(58) Field of Classification Search ........... 454/76, 454/84, 85, 93, 107–109, 112, 121, 151, 152, 454/156; 165/202–204, 42, 43
See application file for complete search history.

(56) References Cited

U.S. PATENT DOCUMENTS

| | | | | |
|---|---|---|---|---|
| 2,732,133 A | * | 1/1956 | Lintern | 237/12.3 B |
| 2,800,285 A | * | 7/1957 | Muller et al. | 237/28 |
| 5,113,748 A | * | 5/1992 | Shibuya | 454/127 |
| 5,419,005 A | * | 5/1995 | Mori | 15/313 |
| 6,422,309 B2 | | 7/2002 | Vincent | |
| 6,470,960 B2 | * | 10/2002 | Kampf et al. | 165/42 |
| 6,530,831 B1 | * | 3/2003 | Colinet | 454/121 |
| 6,598,665 B2 | * | 7/2003 | Schwarz | 165/42 |
| 2002/0007944 A1 | | 1/2002 | Schwarz | |
| 2002/0160706 A1 | * | 10/2002 | Elliot et al. | 454/121 |
| 2002/0164941 A1 | * | 11/2002 | Elliot et al. | 454/121 |
| 2003/0060154 A1 | | 3/2003 | Colinet | |

FOREIGN PATENT DOCUMENTS

FR 2 769 262 4/1999

* cited by examiner

*Primary Examiner*—Gregory Wilson
(74) *Attorney, Agent, or Firm*—Nixon & Vanderhye PC

(57) ABSTRACT

An air-distribution system for the dashboard of a motor vehicle comprises a plurality of auxiliary ducts that branch off in parallel from a manifold. Associated to each auxiliary duct is an additional and independent unit for regulating the flow rate and/or the temperature of the air flow that traverses the respective auxiliary duct. Each auxiliary duct branches off into a number of terminal ducts and is provided with means for the distribution of the air to the terminal ducts, which are preferably of the type comprising means of deviation of the air by the Coanda effect.

13 Claims, 7 Drawing Sheets

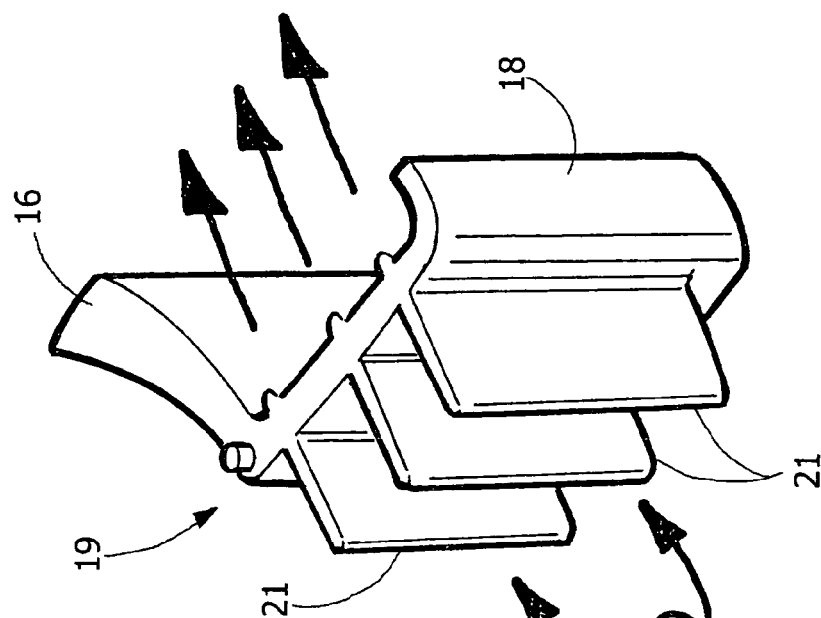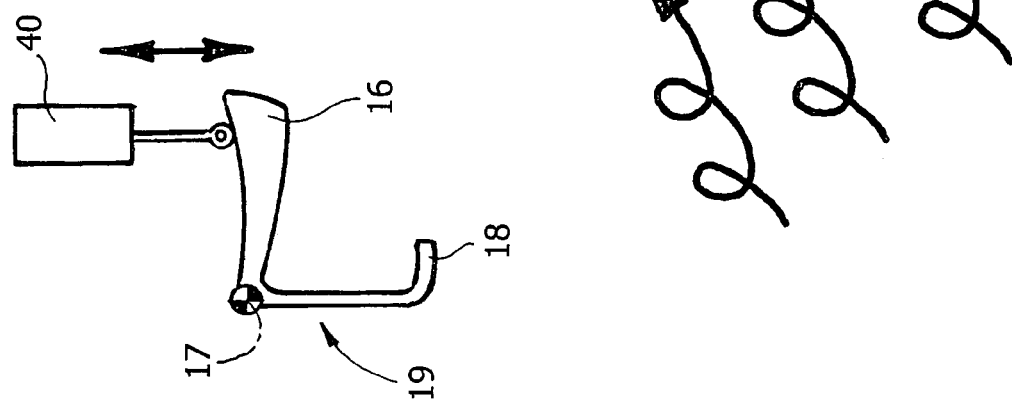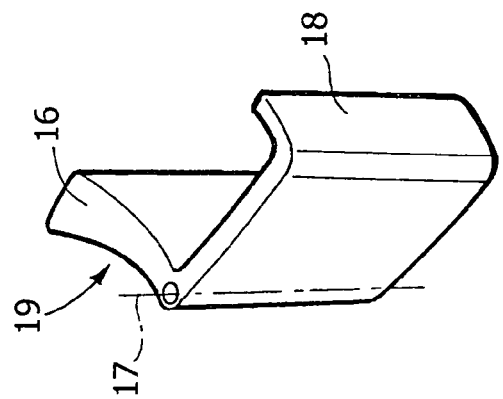

AIR-DISTRIBUTION SYSTEM FOR THE DASHBOARD OF A MOTOR VEHICLE AND THE DASHBOARD OF A MOTOR VEHICLE COMPRISING SAID SYSTEM

SUMMARY OF THE INVENTION

The present invention relates to air-distribution systems for dashboards of motor vehicles of the type comprising a main duct designed to receive a flow of air from a source of conditioned air and a plurality of auxiliary ducts that branch off from the main duct and terminate in air-outflow openings provided on the dashboard.

In air-distribution systems of the type specified above that have been produced up to now, the outflow openings are distributed in various areas of the dashboard for directing a flow of air onto the internal surface of the windscreen of the motor vehicle and/or at the front towards the passenger compartment and/or downwards towards the floor of the passenger compartment. There have already been proposed and used air-distribution systems which, in addition to enabling distribution of the air flow coming from the air-conditioning system among the outflow openings provided in the "windscreen", "front" and "floor" areas, are also able to differentiate the temperature of the air flow between the area of the driver and the area of the passenger sitting beside him and moreover differentiate the temperature of the air flow exiting from the openings provided in the aforesaid three areas, for one and the same setting of the temperature supplied by the air-conditioner. A system of this type has, for example, been proposed and illustrated in the preceding Italian patent application No. TO 2003A000036 in the name of the present applicant, which is still secret at the date of presentation of the present application.

A purpose of the present invention is to improve further the systems previously proposed by providing an air-distribution system for the dashboard of a motor vehicle that will enable extreme flexibility as regards any possibility of differentiation of the flow of air exiting from the various openings of the dashboard, both with reference to a differentiation between the "windscreen", "front", and "floor" areas and with reference to a differentiation between the "driver" and "passenger" areas, as well as with reference to a differentiation, for the driver or for the passenger, between the central area of the dashboard and the area adjacent to the side window of the motor vehicle.

Forming a further purpose of the invention is a system that is characterized by a high degree of flexibility in any possibility of differentiation of the characteristics of the flow of air exiting from the various openings of the dashboard not only with reference to the temperature of the air flow, but also with reference to its flow rate.

Yet a further purpose of the invention is to provide an air-distribution system that will present the characteristics indicated above and that will be provided moreover with a system for the distribution of air towards the various outflow openings that is simple and efficient.

In order to achieve the above and further purposes, the subject of the invention is an air-distribution system for the dashboard of a motor vehicle which comprises a main duct designed to receive a flow of air from a source of conditioned air and a plurality of auxiliary ducts that branch off from the main duct and terminate in air-outflow openings provided on the dashboard, said system being characterized in that:

said main duct gives out into a manifold or rail, from which there branch off a number of auxiliary ducts;

each of the auxiliary ducts that branch off from the manifold branches turn, in turn, into a number of terminal ducts that give out into respective openings on the dashboard;

associated to each of the auxiliary ducts is a distributing device for distributing the air flow among a number of terminal ducts that branch off from each auxiliary duct; and associated to each of the auxiliary ducts is an independent additional unit for regulating at least one characteristic of the air flow.

According to the invention, the aforesaid regulating unit comprises at least one unit for adjusting the flow rate of the air consisting of a fan unit, or a unit for adjusting the temperature of the air, comprising heating means, or both the aforesaid fan unit and aforesaid heating unit.

In the preferred embodiment, each fan unit comprises a fan associated to each auxiliary duct, and an electric motor for controlling the fan unit, which can be controlled independently of the other fan unit associated to the other auxiliary ducts.

Once again in the case of the preferred embodiment, the aforesaid heating unit preferably consists of an electrical resistor set in the auxiliary duct, preferably downstream of the fan.

Furthermore, in the aforesaid preferred embodiment, the distributing device associated to each auxiliary duct comprises means for deflecting the flow of the air of the auxiliary duct into one or more terminal ducts by means of the Coanda effect.

The use of Coanda-effect air distributors in the dashboard of a motor vehicle has already been proposed by the present applicant, for example in its European patent application No. 02738487.4. The Coanda effect is the phenomenon whereby a flow of air exiting from a duct tends to "stick" to a wall set in the proximity of the flow. By exploiting said phenomenon, it is possible to influence the direction of the flow of air that traverses each of the aforesaid auxiliary ducts to orient it towards the terminal duct that is each time selected. Preferably, the means for deviation of the flow based upon the Coanda effect comprise at least one first mobile element, which is provided on a wall of each auxiliary duct in the proximity of the inlet of a terminal duct and can be displaced between a first position, in which it does not interfere with the flow in the auxiliary duct, and a second position, in which it projects into said flow, so that, in the aforesaid first position of said first mobile element, the outflow of air enters a first terminal duct, remaining adherent to a first wall of this by the Coanda effect, whilst, in the second position of said first mobile element, the flow tends to adhere to a second wall opposite to said first wall, once again by the Coanda effect.

According to a further preferred characteristic of the invention, the means of deviation by the Coanda effect further comprise a second mobile element situated on said second wall and mobile also in this case between a first position, not interfering with the flow, and a second position, projecting into the flow, in synchronism with the first mobile element mentioned above, so that when the first mobile element is in its first position, the second mobile element is in its second position, and when the first mobile element is in its second position the second mobile element is in its first position. Once again in the aforesaid preferred embodiment, the first and second mobile elements form part of a single mobile member controlled by a single actuator, which can be of any type, for example an electromagnetic actuator, or piezoelectric actuator, or shape-memory actuator.

According to yet a further characteristic of the invention, provided in the area that separates the initial ends of two terminal ducts that branch off from an auxiliary duct is the inlet of a recirculation passage, which gives out into one of the two terminal ducts and is shaped in such a way as to generate an air circulation within one of the two terminal ducts that masks the inlet of said terminal duct when the flow is deviated into the other terminal duct. In this way, the losses due to leakage of part of the main flow into the terminal duct that is not selected are reduced or eliminated altogether. When the system switches into a position of selection of the terminal duct where there had previously been created the air circulation, the first terminal duct is masked either with a similar system, or by bestowing an adequate conformation on the mobile element that is adjacent to said duct.

BRIEF DESCRIPTION OF THE DRAWINGS

Further characteristics and advantages of the invention will emerge from the ensuing description, with reference to the annexed drawings, which are provided purely by way of non-limiting example and in which:

FIG. 7 is a perspective schematic view of a detail of FIGS. 4–6;

FIG. 8 is a schematic view of an actuator of the item represented in FIG. 7; and FIG. 9 illustrates a variant of FIG. 7.

DETAILED DESCRIPTION OF THE INVENTION

Figure 1:
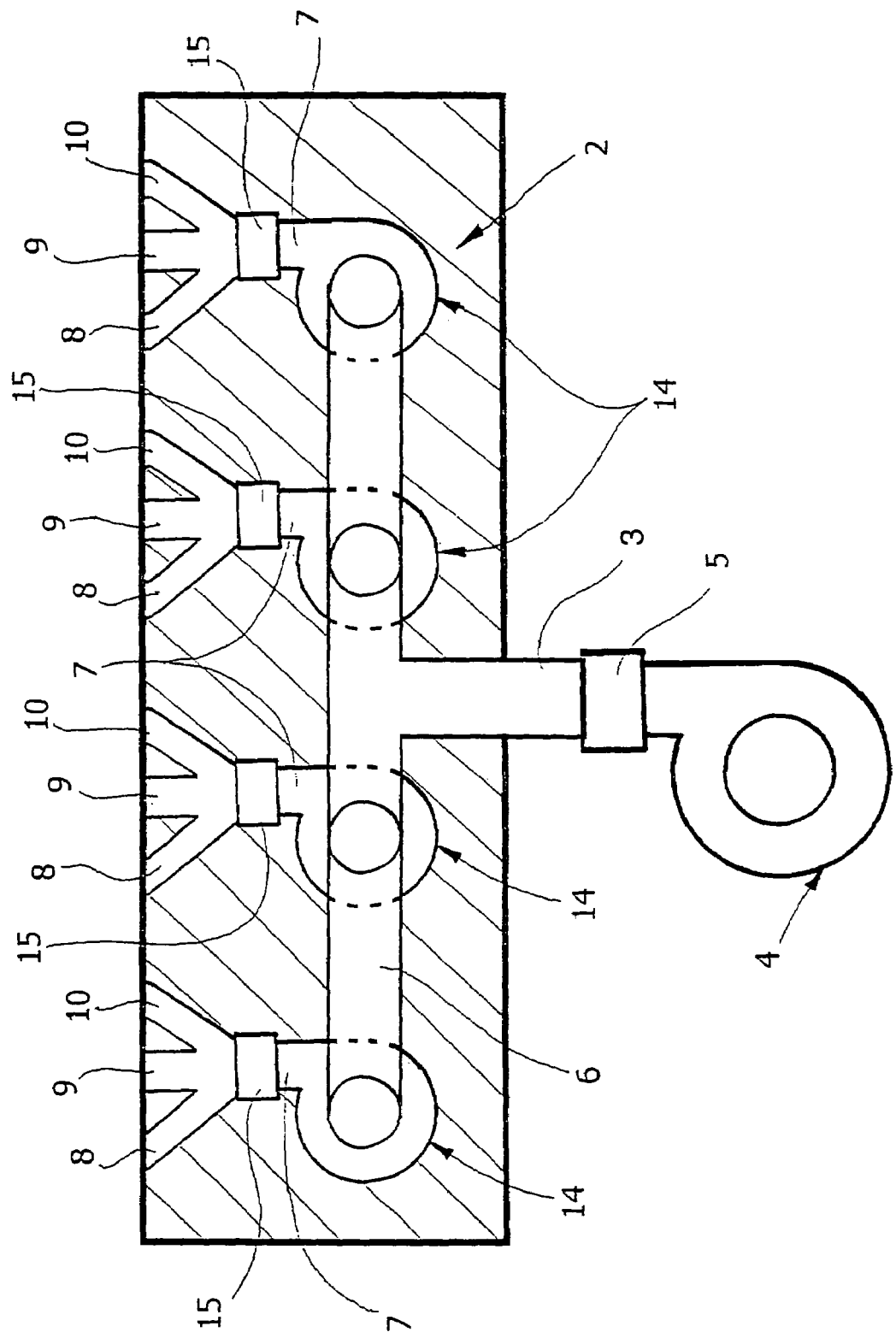
FIG. 1 is a diagram illustrating the principle underlying the air-distribution system according to the invention.
Figure 2:
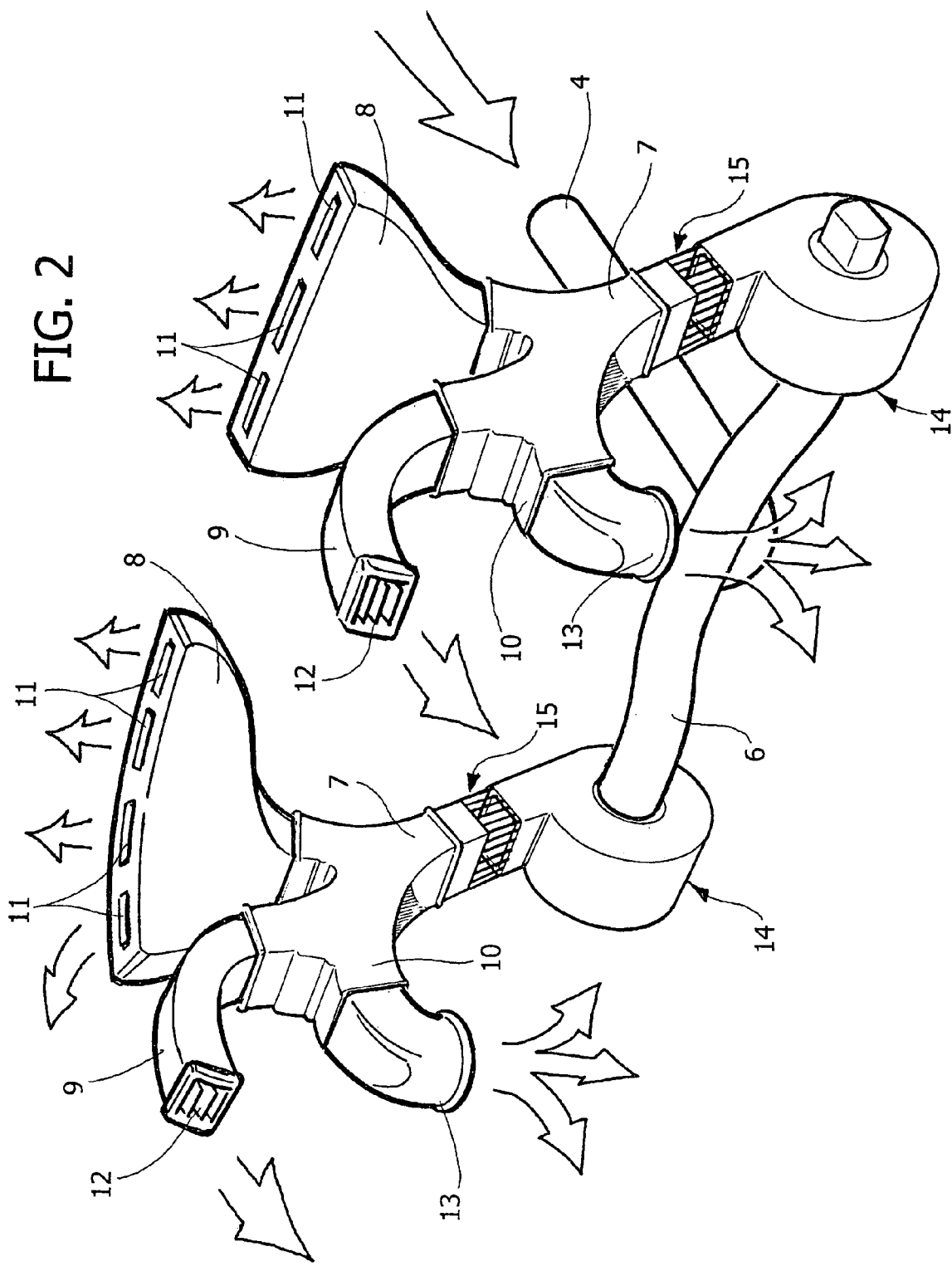
FIG. 2 is a partial schematic perspective view of an air-distribution system for the dashboard of a motor vehicle according to the invention.
Figure 3:
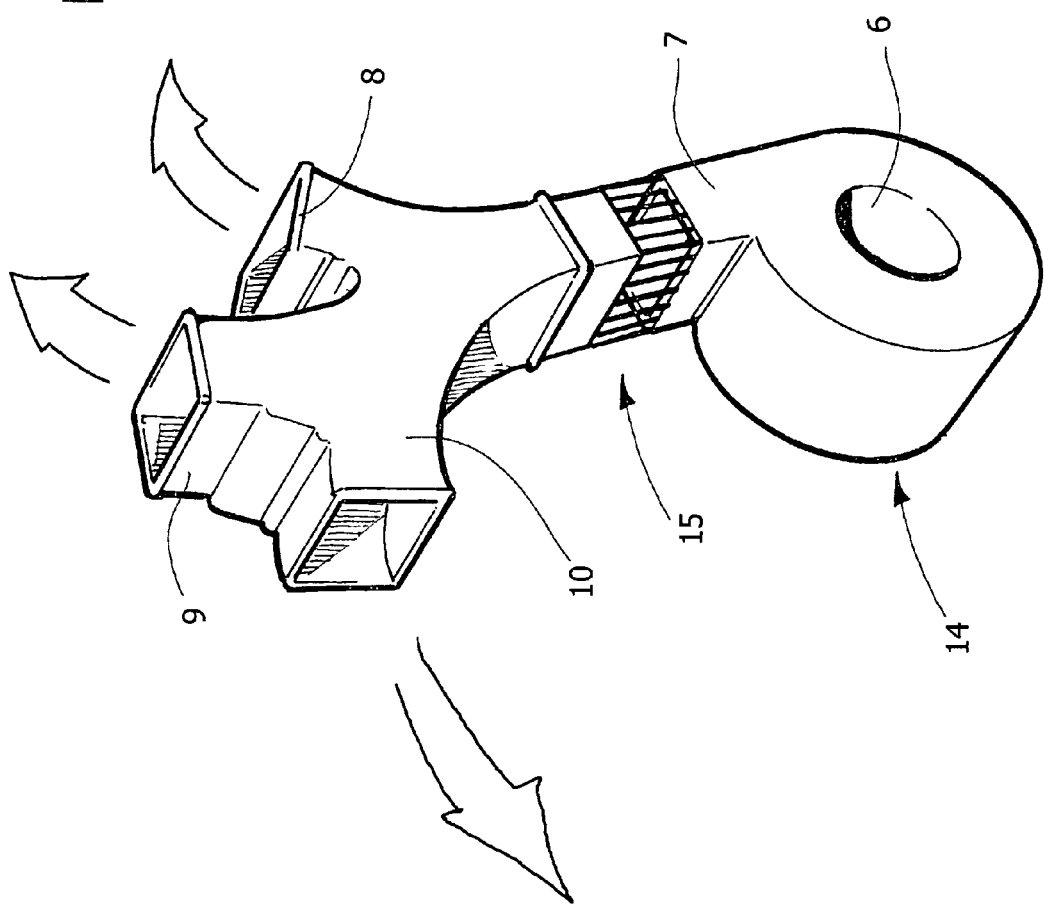
FIG. 3 is a view, at an enlarged scale, of a detail of FIG. 2.

In FIG. 1, the reference number 1 designates as a whole a dashboard, illustrated only schematically, of a motor vehicle, within which there is provided an air-distribution system 2. The system 2 comprises a main duct 3 that receives air from an air-conditioning system, including a main fan 4 and a heater/evaporator 5. The main duct 3 gives out into a manifold or rail 6, from which there branch off four auxiliary ducts 7, distributed in parallel along the dashboard, one pair on the driver side, and one pair on the passenger side, each pair comprising a duct adjacent to the central part of the dashboard and a duct closer to a side window of the motor vehicle. Each auxiliary duct 7 branches off into three terminal ducts 8, 9, 10 (see also FIG. 2), each of which terminates in air-outflow openings in the passenger compartment of the motor vehicle. In particular, the duct 8 supplies openings 11 arranged at the base of the windscreen for directing a flow of air onto the internal surface of the latter. The duct 9 terminates in one or more openings 12 arranged at the front on the dashboard for directing air towards the passenger compartment of the motor vehicle, and the duct 10 terminates in one or more openings 13 that direct a flow of air towards the floor of the passenger compartment.

In the area in which each auxiliary duct 7 branches off into the three terminal ducts 8, 9, 10, there are provided means for distributing the air flow between the terminal ducts, which will be illustrated in detail in what follows.

An important characteristic of the invention lies in the fact that each of the auxiliary ducts 7 is provided with an additional and independent unit for regulating at least one characteristic of the air flow. In particular, associated to each auxiliary duct 7 is, in the example of embodiment illustrated, a unit 14 for regulating the flow rate of the air, and a unit 15 for regulating the temperature of the air. In the example illustrated, the unit 14 comprises a fan with corresponding electric controlling motor, whilst the unit 15 comprises a section of duct in which an electrical resistor is inserted.

Therefore, the distribution system according to the invention enables regulation of the flow rate and/or the temperature of the air flow exiting from the openings 11, 12, 13, separately for each of the auxiliary ducts 7, i.e., in the case of the example illustrated, separately for the driver area and for the passenger area and, for each of said areas, separately for the central area of the dashboard and for the area adjacent to the window.

Figure 4:
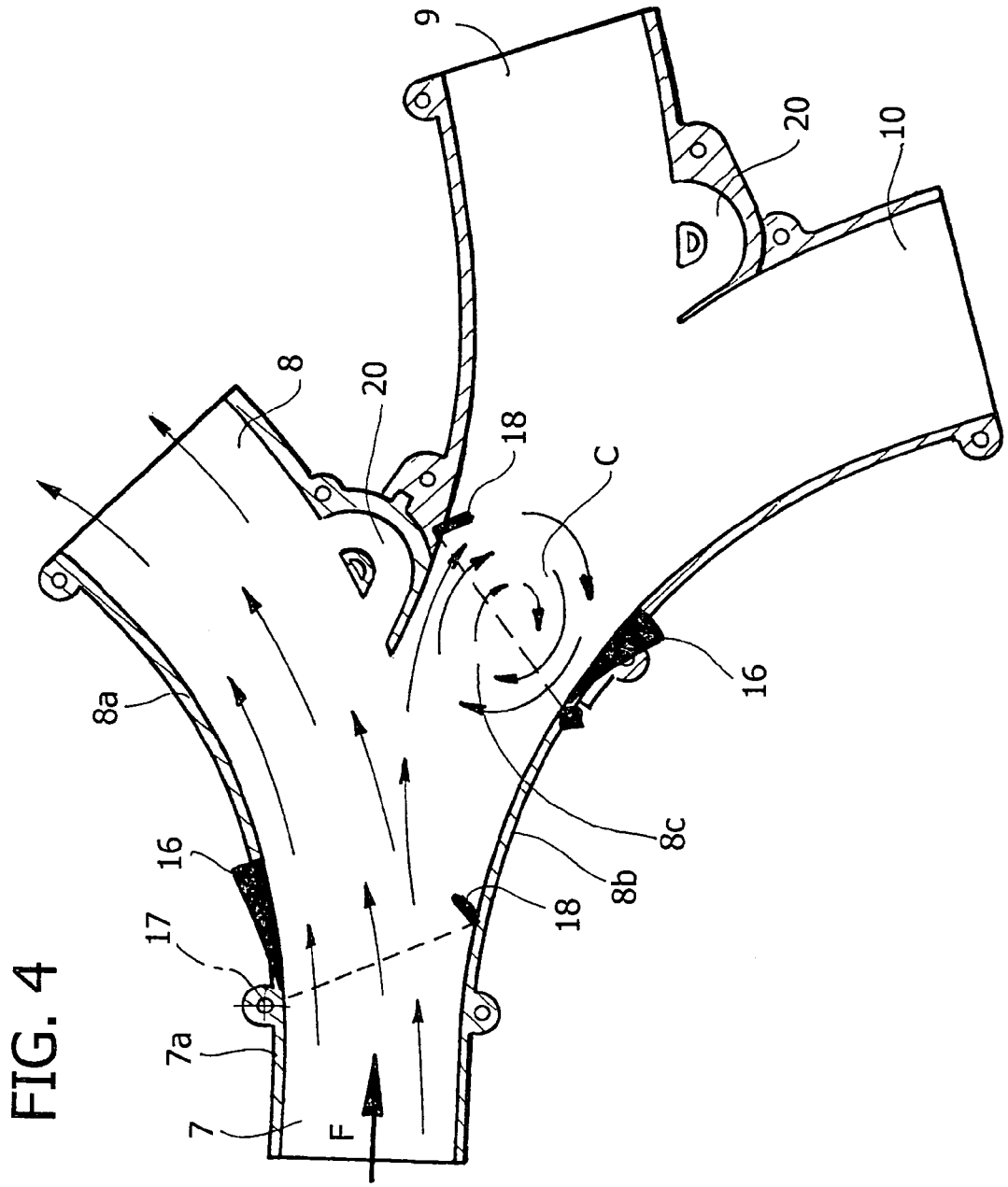
FIGS. 4, 5, 6 are cross-sectional views, at an enlarged scale, of a detail of FIG. 3 that show the system according to the invention in different conditions of operation.
Figure 5:
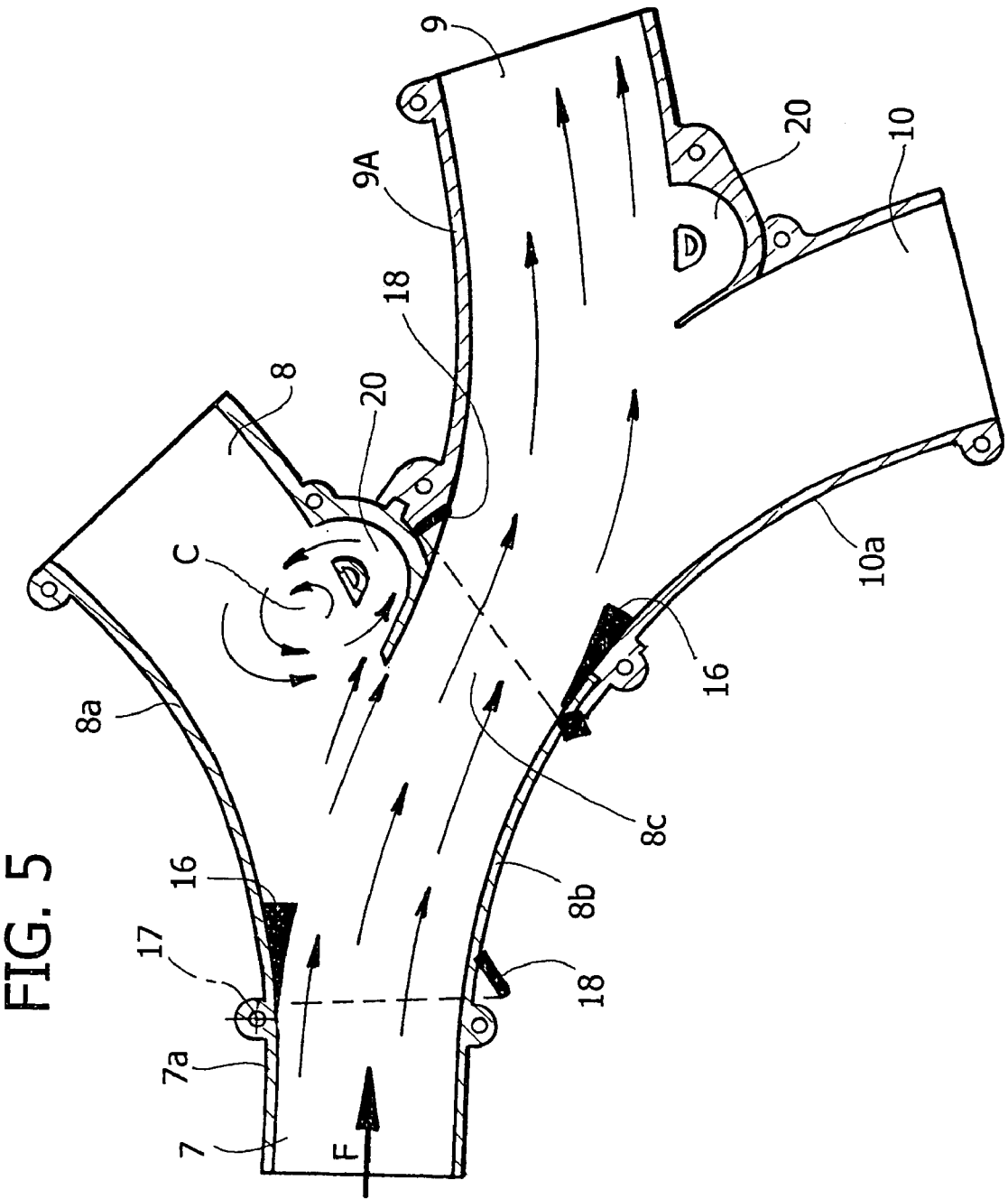
Figure 6:
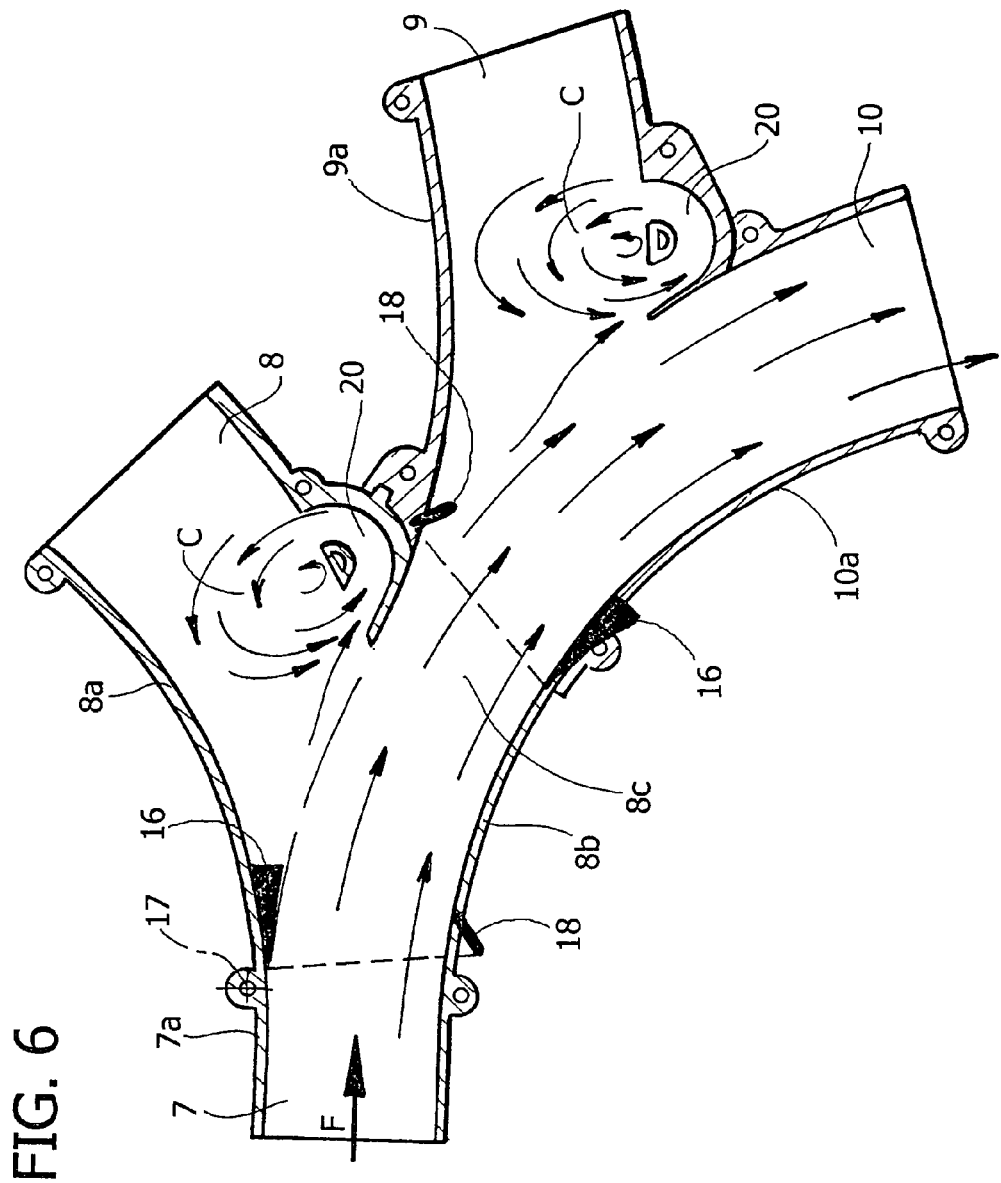

FIGS. 4–6 illustrate the way in which the distribution of the air coming from the each auxiliary duct 7 into the terminal ducts 8, 9, 10 that branch off therefrom is controlled.

With reference to said figures, the first terminal duct 8 has a first curved wall 8a set on the prolongation of a corresponding wall 7a of the auxiliary duct 7. In a position corresponding to said wall, associated to the duct is a mobile element 16, which is mounted oscillating about an axis of articulation 17 on the wall 7a and can be displaced between a first position, visible in FIG. 4, and a second position, visible in FIG. 5. In the first position, illustrated in FIG. 4, the mobile element 16 does not interfere with the air flow F coming from the auxiliary duct 7, so that said flow remains "stuck" to the walls 7a and 8a and consequently enters the first terminal duct 8. In the second position of the mobile element 16 illustrated in FIG. 5, said mobile element projects into the flow F so that it invites said flow to adhere, by the Coanda effect, to a curved wall 8b opposite to the wall 8a and situated at the inlets of the two terminal ducts 9, 10.

To obtain a more efficient distribution of the flow between the terminal duct 8 and the inlets 8c of the two terminal ducts 9, 10, there is provided a further mobile element 18, which can be displaced between a first position, in which it does not interfere with the flow F (illustrated in FIG. 5), and a second position, in which it projects into the flow F (illustrated in FIG. 4). The two mobile elements 16, 18 must be controlled in synchronism so that when the mobile element 16 is in its first position the mobile element 18 is in its second position (FIG. 4), whereas when the first mobile element 16 is in its second position the second mobile element 18 is in its first position (FIG. 5). In the case of the example illustrated, this is obtained very simply in so far as the mobile element 16 and the mobile element 18 form part of a single member 19 mounted articulated to the structure of the duct 7 about the axis 17. As may be seen in FIG. 7, the member 19 comprises a vaned part that defines the element 16, and a U-shaped part, rigidly connected to the vane 16 and substantially orthogonal thereto, which includes a bent cross member that constitutes the mobile element 18.

In the condition illustrated in FIG. 4, the mobile element 18 encourages "sticking" of the flow F to the wall 8 in so far as it prevents the flow F from remaining adherent to the wall 8b. In the condition illustrated in FIG. 5, since the element 18 does not disturb the flow F it enables said flow to stick to the wall 8b by the Coanda effect.

As may be seen in FIGS. 4–6, a further mobile member 19, which includes a first mobile element 16 and a second mobile element 18 altogether similar to the ones described above, is moreover provided in a position corresponding to the inlets 8c of the two terminal ducts 9, 10. The mode of operation of said second mobile member is altogether similar to that of the one described above. In the condition illustrated in FIG. 5, said second mobile member favours the sticking, by the Coanda effect, of the flow to a first curved wall 9a of the terminal duct 9, so that the flow enters said duct, whilst in the condition illustrated in FIG. 6 it favours sticking of the flow to a wall 10a, which is also curved, of the terminal duct 10, so that the flow enters said duct. Furthermore, the mobile element 18 in this case also performs the function of interfering (in the condition illustrated in FIG. 4) with a possible part of the main flow F that were to enter the inlets 8c, bestowing thereon a circulatory motion C (FIG. 4) that "obstructs" the inlets 8c, reducing to a minimum any undesired leakages of air in the ducts 9, 10.

For the same purpose, in a position corresponding to the inlets of the terminal duct 8 and of the terminal duct 9 there are provided air-recirculation passages 20 shaped so that, in the conditions illustrated respectively in FIG. 5 and FIG. 6, any possible undesired leakages of air give rise to an air circulation C that obstructs the duct into which the flow is to be directed.

The mobile members 19 are controlled by actuators of any type, for example electromagnetic actuators (such as the actuator 40 in FIG. 8), or piezoelectric actuators, or shape-memory actuators.

FIG. 8 illustrates a variant of the member 19, in which the U-shaped portion defining the mobile element 18 also includes vanes 21 having the function of straightening the flow.

Of course, without prejudice to the principle of the invention, the details of construction and the embodiments may vary widely with respect to what is described and illustrated herein purely by way of example, without thereby departing from the scope of the present invention.

What is claimed is:

1. An air-distribution system for a dashboard of a motor vehicle, comprising a main duct designed to receive a flow of air from a source of conditioned air, and a plurality of auxiliary ducts that branch off from the main duct and terminate in air-outflow openings provided on the dashboard,
   said system being wherein:
   said main duct gives out into a manifold or rail, from which there branch off a number of auxiliary ducts;
   each of the auxiliary ducts that branch off from the manifold branches off into a number of terminal ducts, which give out into respective outflow openings of the dashboard;
   associated to each of the auxiliary ducts there is an air-distribution device for distributing the air flow that traverses the auxiliary duct among the terminal ducts that branch off therefrom, and wherein the air-distribution device associated to each auxiliary duct comprises means for deflecting the flow of air by the Coanda effect; and
   associated to each of said auxiliary ducts is an independent additional unit for regulating at least one characteristic of the flow of air that traverses the auxiliary duct.

2. The air-distribution system according to claim 1, wherein said regulating unit comprises a fan unit for regulating the flow rate of air that traverses the auxiliary duct.

3. The air-distribution system according to claim 1, wherein said regulating unit comprises a heating unit for regulating the temperature of the air flow that traverses the auxiliary duct.

4. The air-distribution system according to claim 1, wherein said regulating unit comprises both a fan unit for regulating the flow rate of the air through the auxiliary duct and a heating unit for regulating the temperature of the air that traverses the auxiliary duct.

5. The air-distribution system according to claim 1, wherein the aforesaid means of deviation by the Coanda effect comprise a first mobile member, which is set on a wall of the auxiliary duct in the proximity of the inlet of a terminal duct and can be displaced between a first position, in which it does not interfere with the flow in the auxiliary duct, and a second position, in which it projects into the flow of air in the auxiliary duct, so that when the aforesaid first mobile element is in its first position, the flow enters said first terminal duct, remaining adherent, by the Coanda effect, to a first wall of the latter set on the prolongation of said wall of the auxiliary duct; moreover, in the aforesaid second position of the first mobile element the air flow tends to adhere to a wall opposite to said first wall, once again by the Coanda effect.

6. The air-distribution system according to claim 5, wherein the aforesaid means of deviation of air by the Coanda effect comprise a second mobile element situated on said second wall and mobile between a first position, in which it does not interfere with the aforesaid air flow, and a second position, in which it projects into said flow, said first and second mobile elements being displaceable in synchronism with one another so that when the first mobile element is in its first position, the second mobile element is in its second position, whilst when said first mobile element is in its second position, said second mobile element is in its first position.

7. The air-distribution system according to claim 6, wherein the first and second mobile elements form an integral part of a single mobile member.

8. The air-distribution system according to claim 7, wherein said mobile member is mounted oscillating about an axis on the structure of said auxiliary duct.

9. The air-distribution system according to claim 6, wherein there are provided actuator means for control of each mobile element.

10. The air-distribution system according to claim 9, wherein said actuator means are chosen between electromagnetic control means, piezoelectric control means, shape-memory control means, and fluid control means.

11. The air-distribution system according to claim 1, wherein, provided in the area that separates the initial ends of two terminal ducts is the inlet of a recirculation passage giving out into one of the two terminal ducts shaped in such a way as to generate a circulation of air to the inlet of one of the two terminal ducts that masks the inlet of said duct when the main flow is deviated into the other terminal duct.

12. A dashboard for a motor vehicle, wherein the dashboard comprises an air-distribution system comprising a main duct designed to receive a flow of air from a source of conditioned air, and a plurality of auxiliary ducts that branch off from the main duct and terminate in air-outflow openings provided on the dashboard,
   said system being wherein:
   said main duct gives out into a manifold or rail, from which there branch off a number of auxiliary ducts;

each of the auxiliary ducts that branch off from the manifold branches off into a number of terminal ducts, which give out into respective outflow openings of the dashboard;

associated to each of the auxiliary ducts there is an air-distribution device for distributing the air flow that traverses the auxiliary duct among the terminal ducts that branch off therefrom, and wherein the air-distribution device associated to each auxiliary duct comprises means for deflecting the flow of air by the Coanda effect; and associated to each of said auxiliary ducts is an independent additional unit for regulating at least one characteristic of the flow of air that traverses the auxiliary duct.

13. A motor vehicle comprising an air-distribution system, wherein the air-distribution system comprises a main duct designed to receive a flow of air from a source of conditioned air, and a plurality of auxiliary ducts that branch off from the main duct and terminate in air-outflow openings provided on a dashboard, said system being wherein:

said main duct gives out into a manifold or rail, from which there branch off a number of auxiliary ducts;

each of the auxiliary ducts that branch off from the manifold branches off into a number of terminal ducts, which give out into respective outflow openings of the dashboard;

associated to each of the auxiliary ducts there is an air-distribution device for distributing the air flow that traverses the auxiliary duct among the terminal ducts that branch off therefrom, and wherein the air-distribution device associated to each auxiliary duct comprises means for deflecting the flow of air by the Coanda effect; and associated to each of said auxiliary ducts is an independent additional unit for regulating at least one characteristic of the flow of air that traverses the auxiliary duct.

\* \* \* \* \*